United States Patent
Luckmann et al.

(10) Patent No.: US 12,352,329 B2
(45) Date of Patent: Jul. 8, 2025

(54) BRAKE AND FREEWHEEL ARRANGEMENT FOR A MANUALLY MANEUVERABLE PARK AND GARDEN EQUIPMENT

(71) Applicant: FSI POWER-TECH APS, Tørring (DK)

(72) Inventors: Launy Luckmann, Ølholm (DK); Henning Schmidt, Tørring (DK)

(73) Assignee: FSI POWER-TECH APS, Tørring (DE)

( * ) Notice: Subject to any disclaimer, the term of this patent is extended or adjusted under 35 U.S.C. 154(b) by 0 days.

(21) Appl. No.: 18/719,041

(22) PCT Filed: Dec. 9, 2022

(86) PCT No.: PCT/EP2022/085184
§ 371 (c)(1),
(2) Date: Jun. 12, 2024

(87) PCT Pub. No.: WO2023/110671
PCT Pub. Date: Jun. 22, 2023

(65) Prior Publication Data
US 2025/0067314 A1    Feb. 27, 2025

(30) Foreign Application Priority Data
Dec. 15, 2021  (DK) .................. 202170620

(51) Int. Cl.
*F16D 67/02*    (2006.01)
*B60T 1/04*     (2006.01)
(Continued)

(52) U.S. Cl.
CPC ............. *F16D 67/02* (2013.01); *B60T 1/04* (2013.01); *B60T 7/102* (2013.01); *B60T 11/046* (2013.01); *F16D 2121/14* (2013.01)

(58) Field of Classification Search
CPC ...... F16D 67/02; F16D 2121/14; F16D 41/12; F16D 41/16; B60T 1/04; B60T 7/102; B60T 11/046; B62C 7/00
See application file for complete search history.

(56) References Cited

U.S. PATENT DOCUMENTS 4,589,525 A    5/1986  Phipps et al.
5,163,275 A  * 11/1992  Hare .................... A01D 34/824
                                             56/DIG. 18
(Continued)

FOREIGN PATENT DOCUMENTS

AU        11838/66 A    2/1969
CN       214961570 U   12/2021
(Continued)

OTHER PUBLICATIONS

Machine translation of CN 214961571 U (Year: 2021).*
(Continued)

*Primary Examiner* — Farhana Pervin
(74) *Attorney, Agent, or Firm* — Crowell & Moring LLP; John C. Freeman (57) ABSTRACT

A brake and freewheel arrangement for a manually maneuverable park and garden equipment, which equipment includes a maneuvering handle assembly, a base frame, and a pair of wheels, each wheel mounted to an axle, where the brake and freewheel arrangement includes at least one brake pivot axle arranged pivotable in one or more housings. The housings being releasable fastened to the base frame. The brake and freewheel arrangement further including a lever being in one end connected to a maneuvering cable, the lever at an opposite end being connected to a spring element. The brake and freewheel arrangement includes a first locking pawl and a second locking pawl, wherein the first and second locking pawl being connected to the brake pivot axle as a unit.

10 Claims, 11 Drawing Sheets

(51) Int. Cl.
    *B60T 7/10*       (2006.01)
    *B60T 11/04*     (2006.01)
    *F16D 121/14*   (2012.01)

(56) References Cited

U.S. PATENT DOCUMENTS

| | | | |
|---|---|---|---|
| 6,386,169 B1* | 5/2002 | Gracyalny | F02N 15/027 |
| | | | 123/185.14 |
| 6,845,853 B2* | 1/2005 | Baumann | F16D 65/18 |
| | | | 188/72.8 |
| 2018/0030763 A1* | 2/2018 | Distefano | E05B 77/54 |
| 2018/0119754 A1* | 5/2018 | Teillet | A01D 34/6806 |

FOREIGN PATENT DOCUMENTS

| | | |
|---|---|---|
| CN | 214961571 U | 12/2021 |
| GB | 2 317 209 A | 3/1998 |

OTHER PUBLICATIONS

International Search Report and Written Opinion dated Mar. 28, 2023 (13 pages) from PCT Priority Application PCT/EP2022/085184 filed Dec. 9, 2022.
Office Action dated Jul. 5, 2022 from Danish priority Application PA 2021 70620 (9 pages).

\* cited by examiner

BRAKE AND FREEWHEEL ARRANGEMENT FOR A MANUALLY MANEUVERABLE PARK AND GARDEN EQUIPMENT

This application is a National Stage application of International Application No. PCT/EP2022/085184, filed Dec. 9, 2022, the entire contents of which are incorporated herein by reference.

This application claims priority under 35 U.S.C. § 119 (a) to Danish Patent Application No. PA202170620, filed on Dec. 15, 2021, the entire contents of each of which are incorporated herein by reference.

BACKGROUND OF THE INVENTION

Technical Field

The present disclosure relates to a brake and freewheel arrangement for a manually maneuverable park and garden equipment. More specifically, the disclosure relates to a brake and freewheel arrangement for a manually maneuverable park and garden equipment.

BACKGROUND ART

It is known to have a braking system for braking one wheel at a time in relation to a manually maneuverable park and garden equipment also known as "walk behind" non-propelled equipment. For example when operating a stump grinder it is possible to brake one wheel and move the other wheel forwards and backwards thereby creating a swinging movement of a stump grinding tool placed in front of the equipment. Swinging the tool from side-to-side while the stump grinder rotates will result in that the stump being cut into pieces and are removed. When transporting such equipment, which in nature has considerable weight, it can be challenging for the operator to load the equipment on to a trailer using ramps or even to maneuver the equipment through terrain uphill. Here it is possible to make use of the brake system of the equipment to maneuver in uphill direction. If, for example, the left side brake is activated and the right side wheel is moved uphill by moving an operator handle or maneuvering handle of the equipment to one side, then the right side brake is activated and when releasing the left side brake, moving the left wheel in uphill direction by moving the operator—or maneuvering handle of the equipment to the opposite side. By repeating this sequence, it is possible to move the heavy equipment using less effort.

CN 214961571 U discloses a self-propelled tree stump root crusher, including a maneuvering handle assembly, a base frame, and a pair of wheels, each wheel mounted to an axle and a brake mechanism having a brake pad. The maneuvering handle is connected to the brake mechanism by a wire where the brake can be activated on both wheels by pressing the brake pad against the wheels.

A problem with the solutions of the prior art is that it is necessary to brake and unbrake each wheel several times to achieve this function. There is thus a need for improved brake systems for such equipment.

SUMMARY

It is an object of the present disclosure to mitigate, alleviate or eliminate one or more of the above-identified deficiencies and disadvantages in the prior art and solve at least the above mentioned problem. According to a first aspect there is provided a brake and freewheel arrangement for a manually maneuverable park and garden equipment, which equipment includes a maneuvering handle assembly, a base frame, and a pair of wheels, each wheel mounted to an axle, where the brake and freewheel arrangement includes at least one brake pivot axle, arranged pivotable in one or more housings, the housings being releasable fastened to the base frame, the brake and freewheel arrangement further includes a lever being in one end connected to a maneuvering cable, the lever at an opposite end being connected to a spring element, and that the brake and freewheel arrangement includes a first locking pawl and a second locking pawl, the first and second locking pawl being connected to the brake pivot axle as a unit.

Hereby a combined brake and freewheel arrangement is provided where it is possible to switch between a braking position and a one-way freewheeling position as well as a neutral position. Hereby it is possible to provide a brake and freewheel arrangement which can be mounted to the equipment as a unit making it possible to use the same unit for braking each wheel completely or applying a one-way freewheeling acting on both wheels and, at the same time give possibility to move one wheel with the second wheel braked in relation to movement in the opposite direction and vice versa.

According to some aspects, the first and second locking pawl is connected by a spacer, which spacer is connected to the brake pivot axle.

Hereby the aspect makes it possible to space the first and second locking pawls apart. In an aspect, it is possible to change an angle of attack of the second locking pawl in relation to the first locking pawl. Hereby the locking pawls are spaced apart due to the spacer and a distance between the locking pawls can provide that when for example the first locking pawl is engaged with the wheel, the second locking pawl is clear from engagement with the wheel.

According to some aspects, the one or more housings with the brake pivot axle is arranged slidably and lockably relative to the base frame in such a way that a distance between the center of the brake pivot axle and a circumferential surface of the wheel or tire is adjustable.

Hereby is achieved that the brake and freewheel arrangement can be adjusted in relation to the wheel or tire, for example if the tire is changed and size of the tire is not the same. Hereby the arrangement is still able to engage with the wheel or tire and block the wheel when the wheel rotates in one direction and let the wheel rotate when rotating in the opposite direction.

According to some aspects, a distance between a center of the brake pivot axle to an engagement edge of the first locking pawl is less than a distance between the center of the brake pivot axle to an engagement edge of the second locking pawl.

Hereby the brake and freewheel arrangement shows a locking pawl for one-way freewheeling and one locking pawl for braking and possibility for engaging one at a time as well as being positioned in a neutral position.

According to some aspects, a stop is provided determining a limit of rotation of the lever in relation to the brake pivot axle.

Hereby it is possible to determine how much the first locking pawl engages with the wheel or tire.

According to some aspects, the stop is adjustable in direction perpendicular to a circumferential surface of the wheel or tire.

Hereby it is possible to adjust the engagement of the first locking pawl in relation to the tire.

According to some aspects, the stop is provided by a substantially L-shaped plate, securable by a screw and/or a bolt to the base frame.

Hereby is achieved a simple mechanical stop which is easy to mount and to adjust if necessary.

According to some aspects, the engagement edge of the first locking pawl and/or the engagement edge of the second locking pawl is curved.

Hereby is achieved a shape of at least one of the engaging edges differs from a straight line giving a better grip.

According to some aspects, the curve of the engagement edges is concave.

Hereby is achieved a shape of at least one of the engaging edges corresponds better to a rounding of a tire than a straight line.

According to some aspects, a control lever assembly including at least one brake control lever and a freewheeling control lever for controlling the brake and freewheel arrangement is mountable on the maneuvering handle assembly.

Hereby is achieved that the control handles are within reach of the user in such a way that it is not necessary to let go of the maneuvering handle assembly with more than one hand, when operating the control levers.

According to some aspects, the spring element is a helical spring.

According to the aspects described above, it is possible to move the manually maneuverable park and garden equipment by wriggling the maneuvering handle from side to side without need to brake and unbrake the equipment. It is just needed to engage the one-way freewheeling configuration and the move the maneuvering handle from side to side.

The present disclosure will become apparent from the detailed description given below. The detailed description and specific examples disclose preferred embodiments or aspects of the disclosure by way of illustration only. Those skilled in the art understand from guidance in the detailed description that changes and modifications may be made within the scope of the disclosure.

Hence, it is to be understood that the herein disclosed disclosure is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

Terminology—The term "freewheeling" is to be interpreted as a one way braking of the wheel, letting the wheel rotate in one direction, but preventing the wheel from rotation in an opposite direction.

The term "circumferential surface" is to be interpreted as an outer radial surface of the wheel or tire as well as the sides and/or shoulders of the wheel or tire being the area between the outer radial surface and the sides of the tire. The circumferential surface being surfaces of a ring or toroid, apart from the surface closest to the center if the wheel.

BRIEF DESCRIPTIONS OF THE DRAWINGS

The above objects, as well as additional objects, features and advantages of the present disclosure, will be more fully appreciated by reference to the following illustrative and non-limiting detailed description of example embodiments of the present disclosure, when taken in conjunction with the accompanying drawings.

DETAILED DESCRIPTION

The present disclosure will now be described with reference to the accompanying drawings, in which preferred example embodiments of the disclosure are shown. The disclosure may, however, be embodied in other forms and should not be construed as limited to the herein disclosed embodiments. The disclosed embodiments are provided to fully convey the scope of the disclosure to the skilled person.

Figure 1:
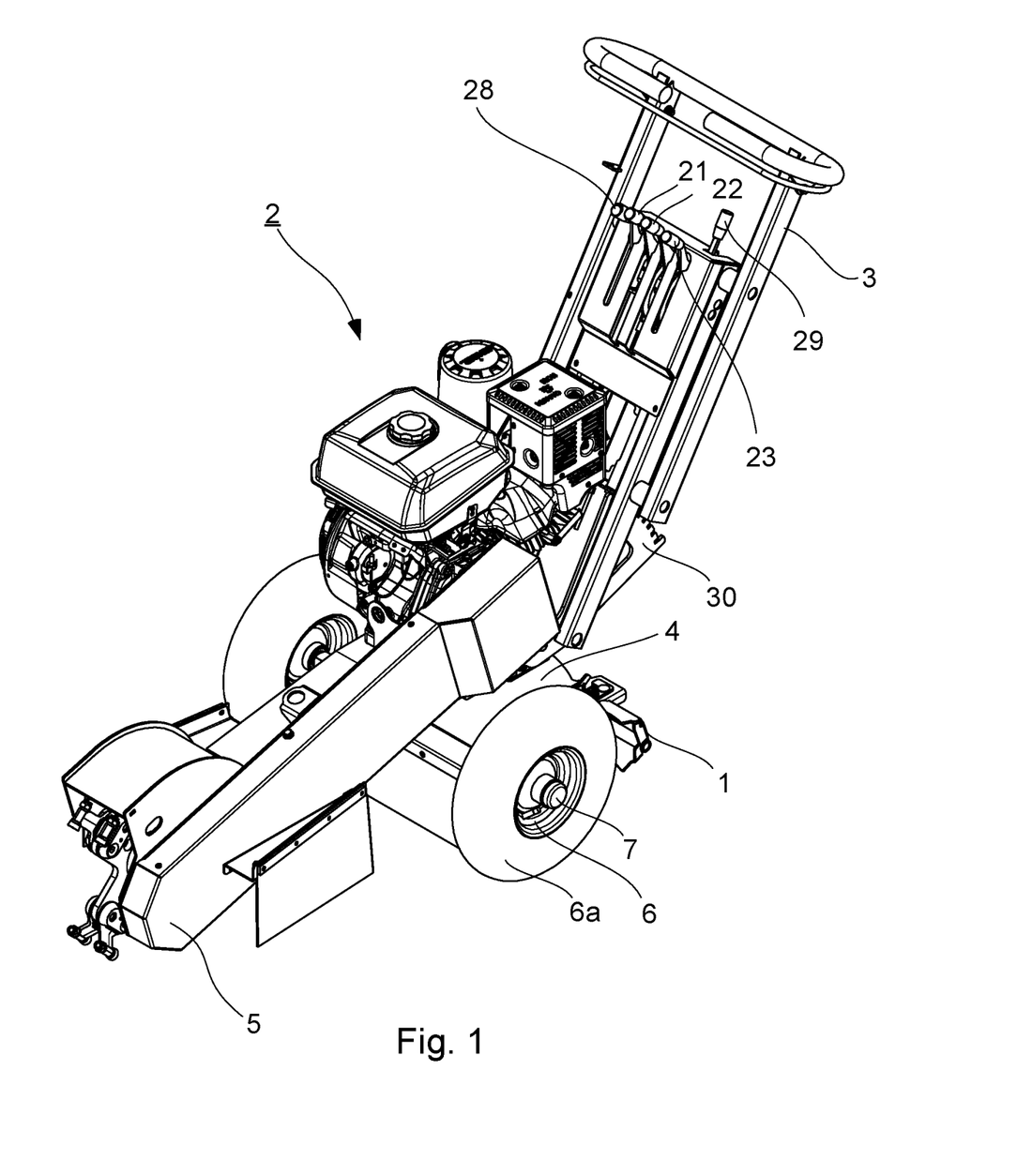
FIG. 1 shows a manually maneuverable park and garden equipment including a brake and freewheel arrangement according to an embodiment of the present disclosure.
Figure 2:
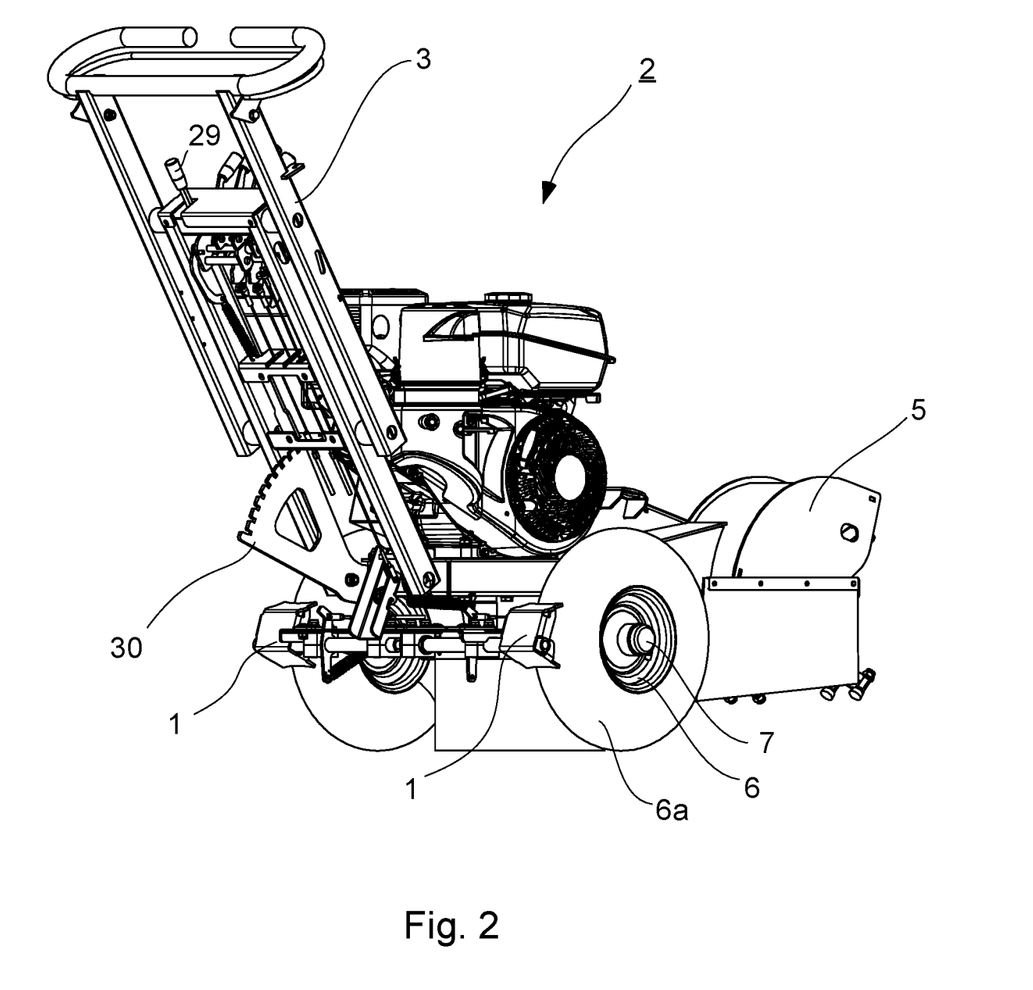
FIG. 2 shows the equipment of FIG. 1 seen from another side.

FIGS. 1 and 2 shows examples of a manually maneuverable park and garden equipment 2, where a brake and freewheel arrangement 1 according to the disclosure is mounted.

The first aspect of this disclosure shows a brake and freewheel arrangement 1 for a manually maneuverable park and garden equipment 2, which equipment 2 includes a maneuvering handle assembly 3, a base frame 4, and a pair of wheels 6, each wheel 6 mounted to an axle 7, at least one brake pivot axle 8, arranged pivotable in one or more housings 8a, said housings 8a being releasable fastened to the base frame 4, the brake and freewheel arrangement 1 includes a lever 9 being in one end connected to a maneuvering cable 10, the lever 9 at an opposite end being connected to a spring element 11, where the brake and freewheel arrangement 1 includes a first locking pawl 12 and a second locking pawl 13, the first and second locking pawl 12, 13 being connected to the brake pivot axle 8 as a unit.

The cable 10 is in one end provided with a yoke 34 for attaching the cable end to the lever 9. The cable 10 is also provided with an adjuster or adjustment means 35 such as a nut or barrel for adjusting the position of the cable 10 in cooperation with a cable fixture 36 fastened on the base frame 4.

In an aspect, the first and second locking pawl 12, 13 is connected by a spacer 14, which spacer 14 is pivotably connected to the brake pivot axle 8.

Hereby the locking pawls 12, 13 are spaced apart due to the spacer 14 and a distance between the locking pawls 12, 13 can provide that when for example the first locking pawl 12 is engaged with the wheel 6, the second locking pawl 13 is clear from engagement with the wheel 6.

In an aspect, the one or more housings 8a with the brake pivot axle 8 is arranged slidably and lockably relative to the base frame 4 in such a way that a distance between the center of the brake pivot axle 8 and a circumferential surface 6a of the wheel or tire 6 is adjustable.

The housing 8a can be locked or fastened in a suitable distance from the circumferential surface 6a of the wheel or tire 6 by an attachment or attachment means 18 such as bolts, screws or the like, which suitable distance is a distance between a center of the brake pivot axle 8 and an engagement edge 16 of the first braking pawl 12 being greater than a distance between the center of the brake pivot axle 8 and the circumferential surface 6a of the wheel or tire 6.

In an aspect, a distance between a center of the brake pivot axle 8 to an engagement edge 16 of the first locking pawl 12 is less than a distance between the center of the brake pivot axle 8 to an engagement edge 17 of the second locking pawl 13.

In an aspect, a stop 15 is provided determining a limit of rotation of the lever 9 in relation to the brake pivot axle 8.

In an aspect, the stop 15 is adjustable in direction perpendicular to a circumferential surface 6a of the wheel or tire 6.

In an aspect, the stop 15 is provided by a substantially L-shaped plate, secured by a screw and/or a bolt 19 to the base frame 4.

In an aspect, the engagement edge 16 of the first locking pawl 12 and/or the engagement edge 17 of the second locking pawl 13 is curved.

In an aspect, the curve of the engagement edges 16, 17 is concave.

In an aspect, the spring element 11 is a helical spring.

The brake can be in adjusted to three positions using the control lever: a first braked position, a second "freewheeling" position and a third neutral position.

In the freewheeling position the first lower locking pawl 12 is pulled towards the wheel circumference by the spring element (spring) and when the wheel shown in FIGS. 9 and 11 to 18 rotates in a clockwise direction, the first locking pawl 12 will scrape against the circumferential surface 6a of the wheel or tire, forced by the spring element, but allowing the wheel to turn. When the wheel turns in an anticlockwise direction, the first locking pawl 12 will be forced by the spring element 11 against the circumferential surface 6a of the wheel or tire 6, and friction between the wheel 6 and the edge 16 of the first locking pawl 12 will move the first locking pawl 12 in same direction as the surface 6a of the wheel 6.

The first locking pawl 12 is fastened to the lever 9 and pivots together with a brake pivot axle 8, the axle being pivotable in a housing 8a. A distance between the edge 16 of the first locking pawl 12 and a center of the brake pivot axle is greater than a distance from the center of the brake pivot axle to the circumferential surface 6a of the wheel or tyre 6. Hereby is achieved that when the first locking pawl 12 is in a freewheeling position, the edge 16 of the first locking pawl 12 is pressed into or firmly towards the wheel or tire and moving together with the wheel in the anticlockwise direction until the lever 9 abuts a stop 15.

The brake pivot axle 8 is placed pivotable in the housing 8a, which housing 8a is adjustable in relation to the base frame 4 and thereby in relation to the wheel 6.

The housing 8a is adjustable in a direction parallel with an elongate opening or slit 4a in the base frame 4.

In an aspect, the elongate opening 4a can have different shapes such as rectangular or oval, and in an alternative aspect the opening 4a can be circular, square or another shape.

The essential is that the lever 9 can protrude through the opening 4a in the base frame in such a way that the lever 9 extends above the base frame 4 as well as below the base frame 4 through the opening 4a and that the lever 9 together with the brake pivot axle 8 can be displaced relative to the base frame 4 while the lever is placed through the opening 4a.

In an aspect, the stop 15 is adjustable. Adjusting the stop 15, limits how many degrees the lever 9 can rotate in relation to the brake pivot axle 8.

When the first locking pawl 12 presses into the wheel or tire 6 and is prevented from further rotation/movement by the lever 9 abutting the stop 15, the wheel is braked from further rotation in anticlockwise direction.

The braking function of the first locking pawl 12 is effective as long as a resulting radial force between the edge 16 of the first locking pawl 12 and the circumferential surface 6a of the wheel or tire 6 is greater than a resulting tangential force in the same point.

When the equipment 2 is pushed in an opposite direction than the direction causing the anticlockwise rotation of the wheel 6, the first locking pawl 12 will move in the same direction as the surface 6a of the wheel or tire 6 and release braking of the wheel 6.

In freewheeling position or one way braking position the first locking pawl 12 again will slide or scrape against the circumferential surface 6a of the wheel or tire 6, forced by the spring element 11, but allowing the wheel 6 to turn in clockwise direction.

Figure 14:
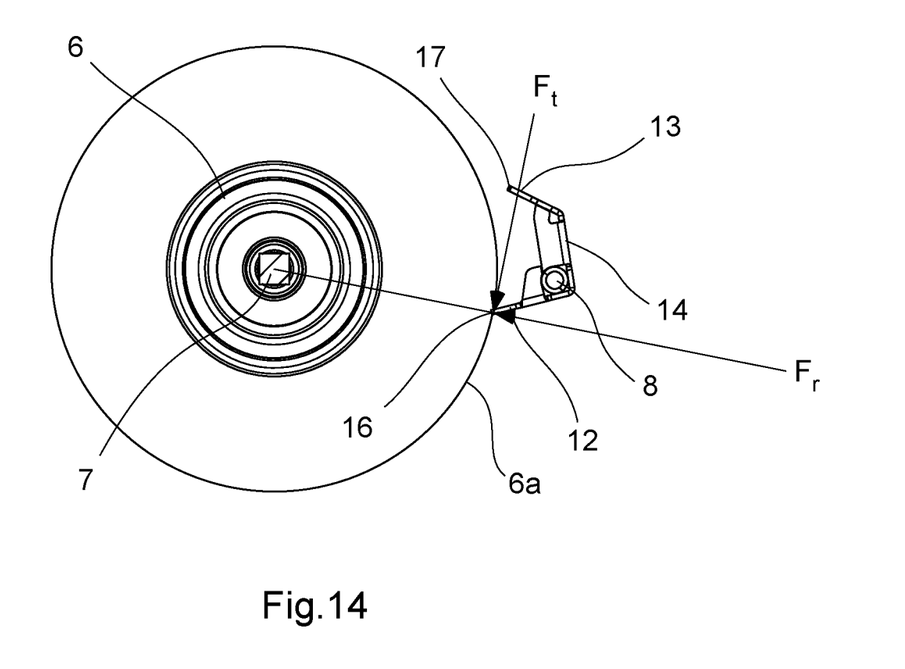
FIG. 14 shows schematically the view of FIG. 13, showing the position of the locking pawls of the brake and freewheel arrangement.
Figure 15:
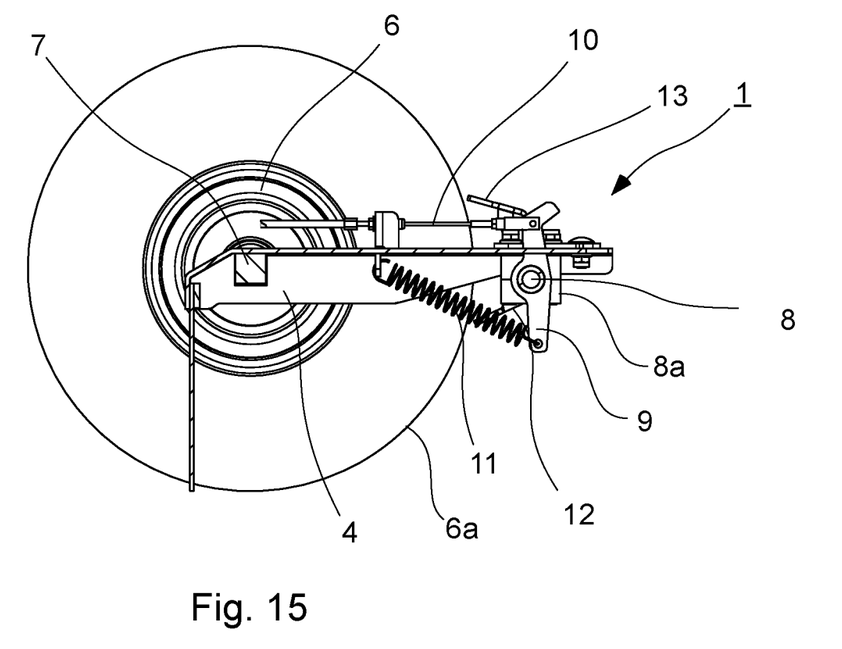
FIG. 15 shows a view similar to FIG. 11, but with the wheel unblocked and with the locking pawls of the brake and freewheel arrangement in a neutral configuration.
Figure 16:
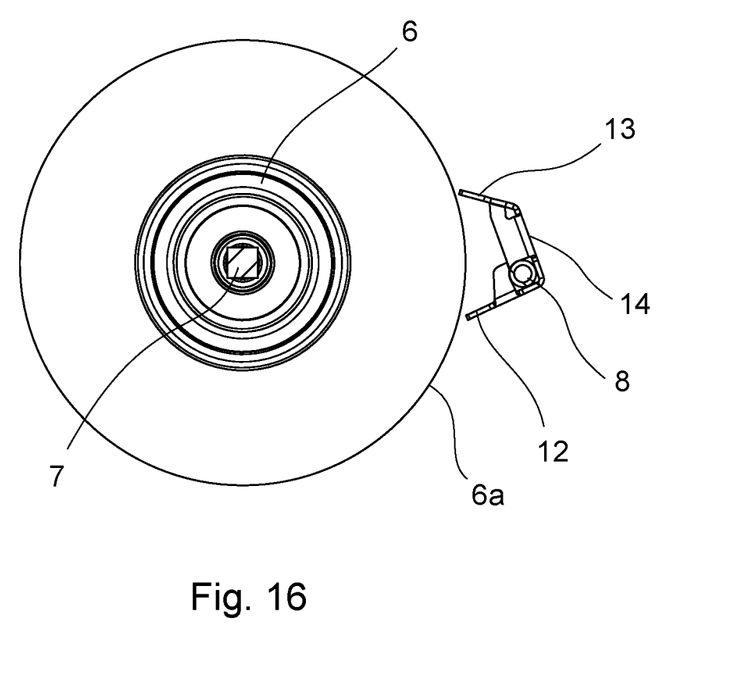
FIG. 16 shows schematically the view of FIG. 15, showing the position of the locking pawls of the brake and freewheel arrangement in a neutral configuration.
Figure 17:
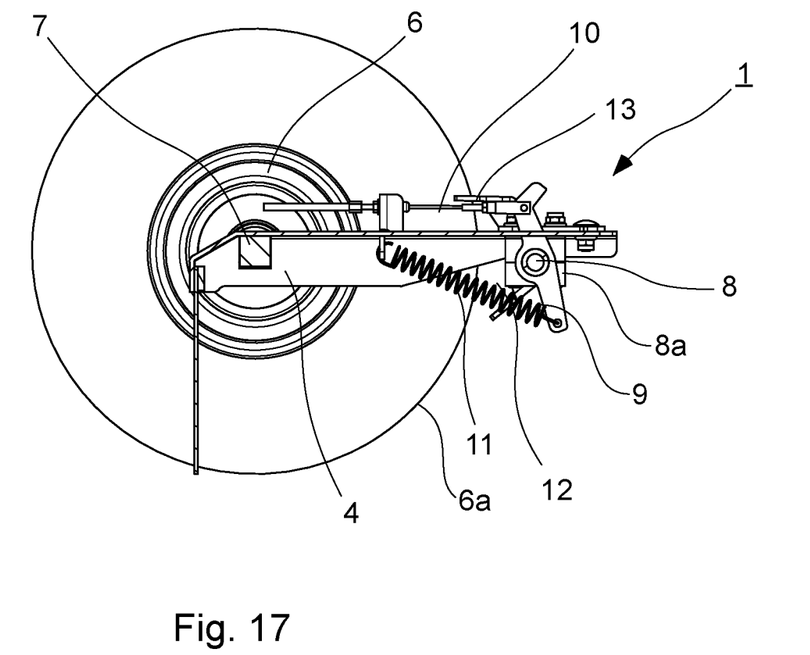
FIG. 17 shows a view similar to FIG. 11, but with the wheel blocked and with the locking pawls of the brake and freewheel arrangement in a braked configuration.
Figure 18:
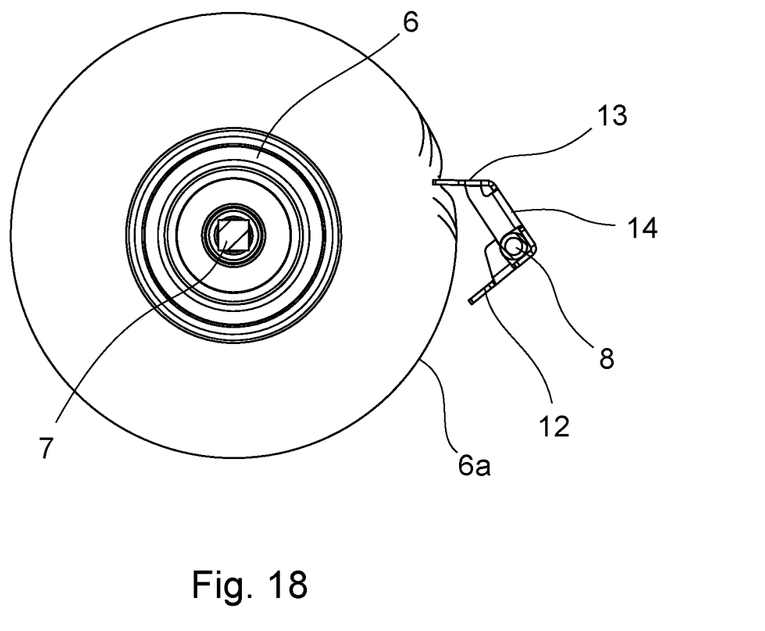
FIG. 18 shows schematically the view of FIG. 17, showing the position of the locking pawls of the brake and freewheel arrangement in a braked configuration.
Figure 19:
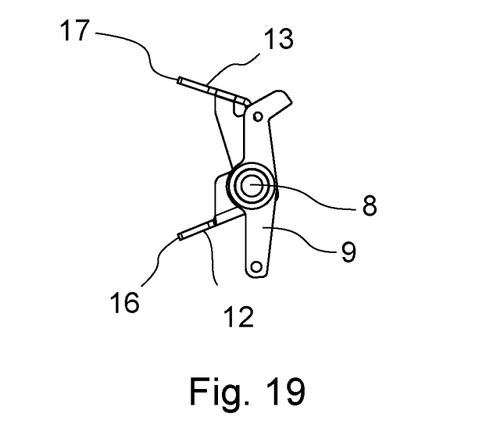
FIG. 19 shows the brake and freewheel arrangement seen form the brake pivot axle end.
Figure 20:
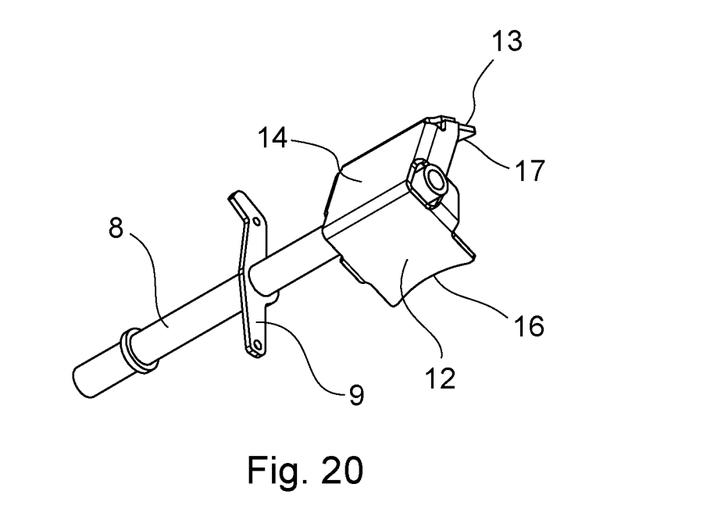
FIG. 20 shows the brake and freewheel arrangement in a perspective view of FIG. 19.

As long as the resulting radial force "Fr", as shown in FIG. 14, is greater than the resulting tangential force "Ft", the first locking pawl 12 will operate and block the wheel or tyre 6 in one rotational direction as well as provide a freewheeling function when the wheel 6 rotates in the opposite direction.

It is obvious that the freewheeling direction depends on which side of the wheel 6 the first locking pawl 12 is placed.

In the Figures, the brake and freewheel arrangement 1 is placed in a rearwards side of the wheels 6 facing an operator and the maneuvering handle 3. In case the brake and freewheel arrangement 1 is placed on the opposite side of the wheels 6 i.e. on a tool 5 side pointing away from the operator and the maneuvering handle 3, the effect will be braking and freewheeling in an opposite direction than mentioned above.

The figures where the brake or the one-way freewheeling function is activated show the locking pawl 12 to go into the wheel. This is shown symbolically and it should be perceived as the locking pawl 12 engaging with the tire pattern and/or being pressed against and deforming the wheel or tire 6.

In a preferred aspect, the brake pivot axle 8 is parallel with the wheel axle 7.

To be able to operate the brake and freewheel arrangement 1 a control lever assembly 20 is provided. The control lever assembly includes at least one brake lever 21, 22 for applying a braking function to the brake and freewheel arrangement 1. In a preferred aspect, there is separate brake levers such as a right brake lever 21 for controlling braking of the right wheel 6 and a left brake lever 22 for controlling braking of the left wheel 6. Further, the control lever assembly 20 includes a freewheeling control lever 23.

The control lever assembly 20 can also be provided with optional control levers, for example a swing control lever 28 for releasing and locking a swinging movement of an upper part of the manually maneuverable park and garden equipment 2 including the tool 5 in relation to the base frame 4 and an elevation control lever 29 for adjusting height and/or elevation of the maneuvering handle assembly 3 into a height and/or elevation suitable for a user of the equipment 2. The elevation control lever 29 is connected to a pawl via a cable, a rod or similar (not shown) whereby the pawl can be activated and deactivated to engage with a maneuvering handle 3 elevation rack 30, which rack can be curved and toothed or serrated to be able to engage with the pawl.

It is not essential that the swing control lever 28 and the elevation control lever 29 are placed close to the brake and freewheeling levers, they just have to be within reach of the user in such a way that it is not necessary to let go of the maneuvering handle with more than one hand, when operating the control levers 21, 22, 28, 29.

In an aspect, the brake control levers 21, 22 are arranged rotatable in relation to a first control lever axle 24 and are connected via a brake connection arm 31 to a wire or cable 10 for controlling the lever 9 of the brake and freewheel arrangement 1. The freewheeling control lever 23 is arranged rotatably in relation to a second control lever axle 25, which second axle 25 is parallel with the first axle 24. To the freewheeling control lever 23 is in an end close to the second control lever axle 25 provided with a stop pin 26 extending parallel to the first and second control lever axles 24, 25, which stop pin 26 in its opposite end is attached to a bracket 23a, the bracket 23a being arranged rotatably in relation to the second control lever axle 25 and parallel with the freewheeling control lever 23. Thereby the freewheeling control lever 23 and the bracket 23a moves synchronously. When the user moves the freewheeling control lever 23 towards himself, the freewheeling control lever 23, a protrusion 33a of the lever arm 23 abuts a stop bar 33. The stop bar acts as a stop bar 33 also for the brake levers 21, 22.

Figures 3, 4:
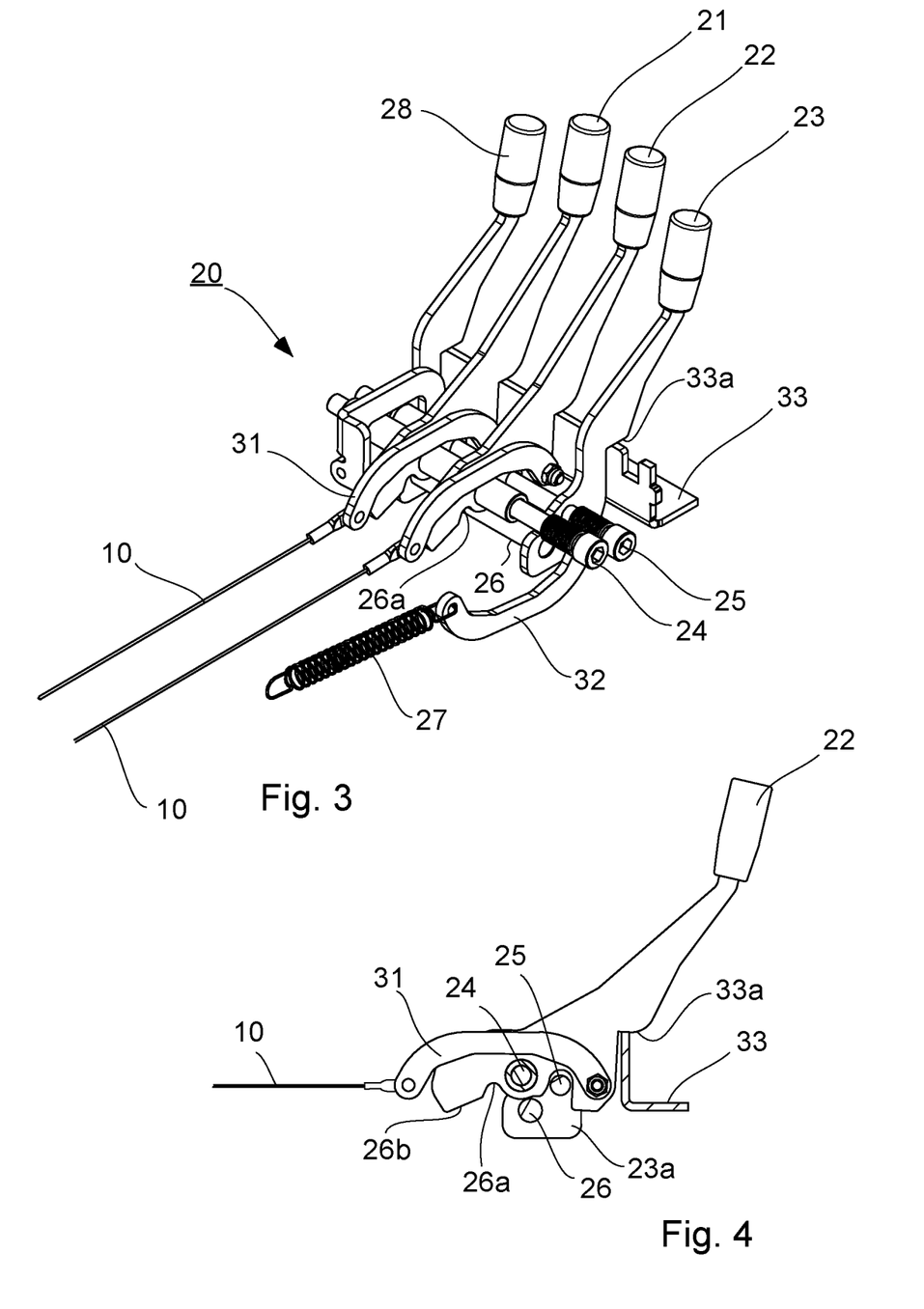
FIG. 3 shows a control lever assembly in a control position with the brake and freewheel arrangement in braked configuration.
FIG. 4 shows schematically the brake levers in a side view of FIG. 3 with the freewheeling control lever removed.

With the freewheeling control lever 23 and the brake levers 21, 22 in a position abutting the stop bar 33, the cables 10 are tensioned and the brakes are applied as shown in FIGS. 3 and 4. A notch 25a in the brake levers 21, 22 makes space for the second control lever axle 25, when the levers 21, 22 are in braked position. A stop notch 26a in the brake levers 21, 22 is made for abutting the stop pin 26, when the brake levers 21, 22 are in neutral position. A face 26b below the stop notch 26a on the brake levers 21, 22 is made for abutting the stop pin 26, when the brake levers 21, 22 are in freewheeling position.

Figure 5:
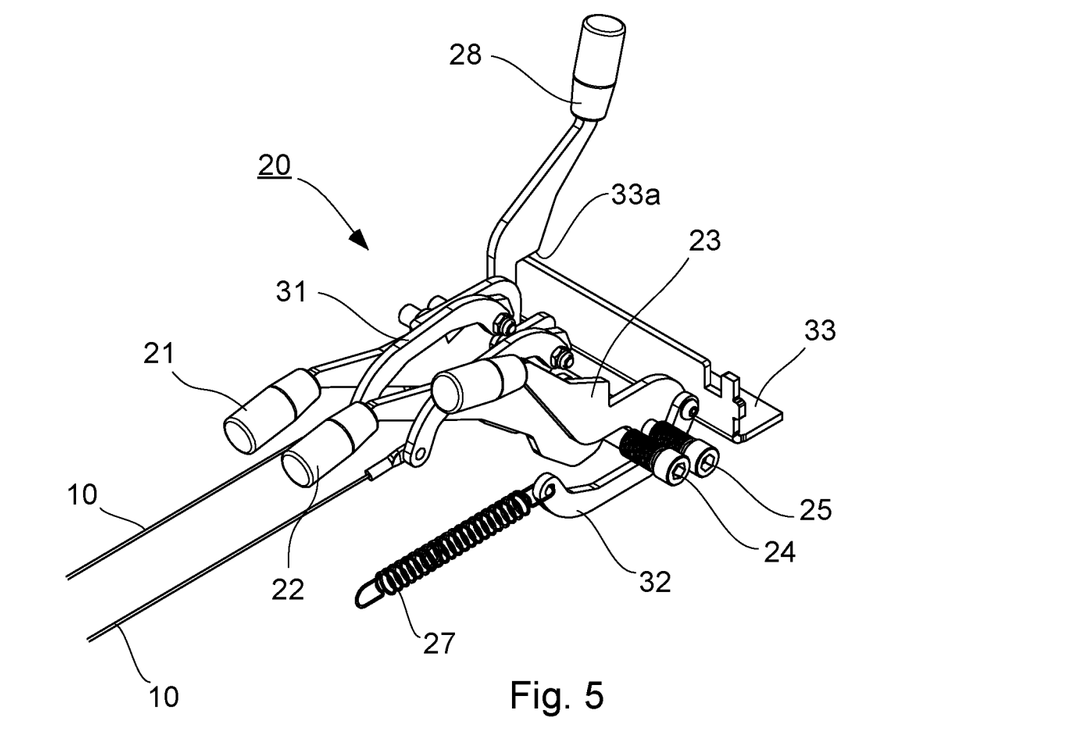
FIG. 5 shows the control lever assembly in a control position with the brake and freewheel arrangement in a one-way freewheeling configuration.
Figure 6:
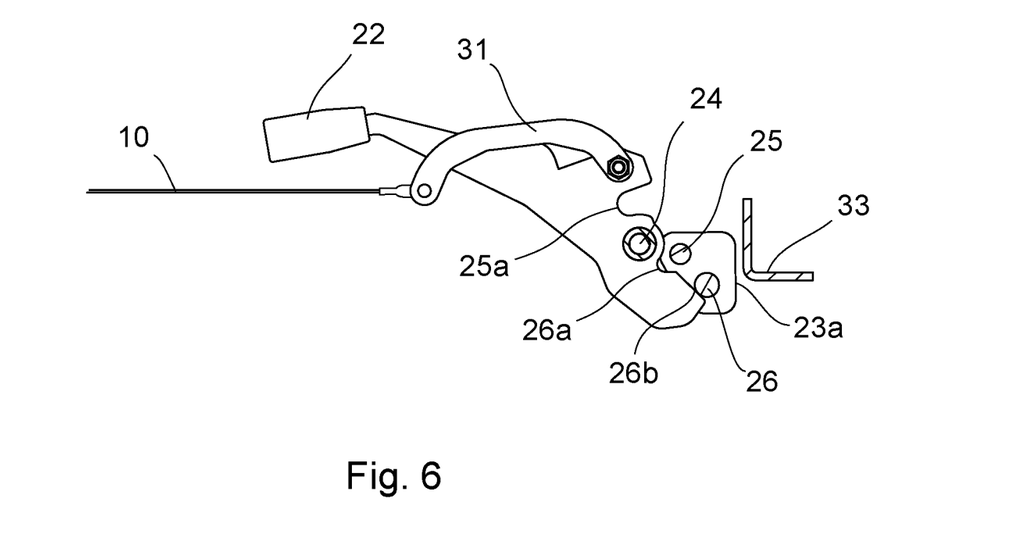
FIG. 6 shows schematically the brake levers in a side view of FIG. 5 with the freewheeling control lever removed.

The brake levers 21, 22 are placed in freewheeling position, as shown in FIGS. 5 and 6, by the user by pushing the freewheeling control lever 23 forward in relation to the user and in relation to the maneuvering handle 3. With the freewheeling control lever 23 in forward position, the brake control levers 21, 22 are pushed forward in same direction as the freewheeling control lever 23 and the stop notch 26a abuts the stop pin 26 and thereby determine a travel distance for the brake control levers 21, 22.

In this position, the cables 10 are slacked and the brake and freewheel arrangement 1 is positioned in such a way that the engagement edge 16 of the first locking pawl 12 touches the circumferential surface 6a of the wheel 6 and a freewheeling operation as explained in the above is achieved.

Figure 7:
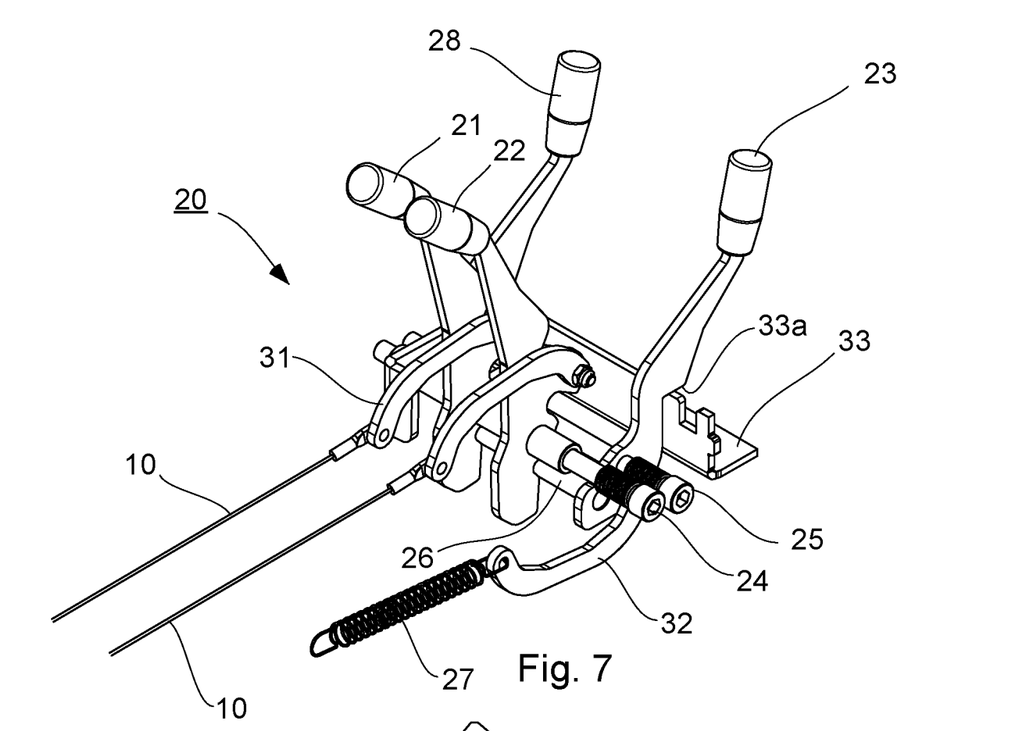
FIG. 7 shows the control lever assembly in a control position with the brake and freewheel arrangement in a neutral configuration.
Figure 8:
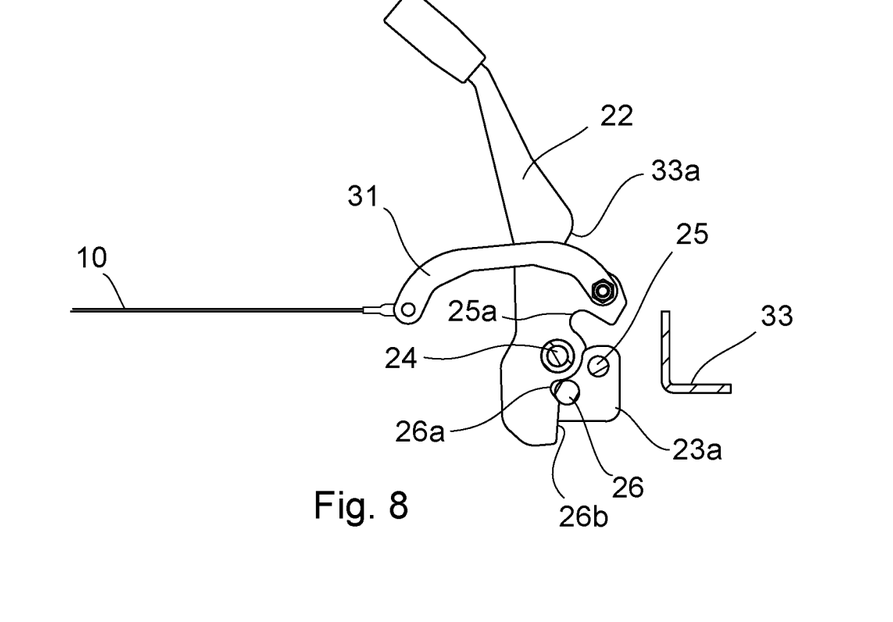
FIG. 8 shows schematically the brake levers in a side view of FIG. 7 with the freewheeling control lever removed.
Figure 9:
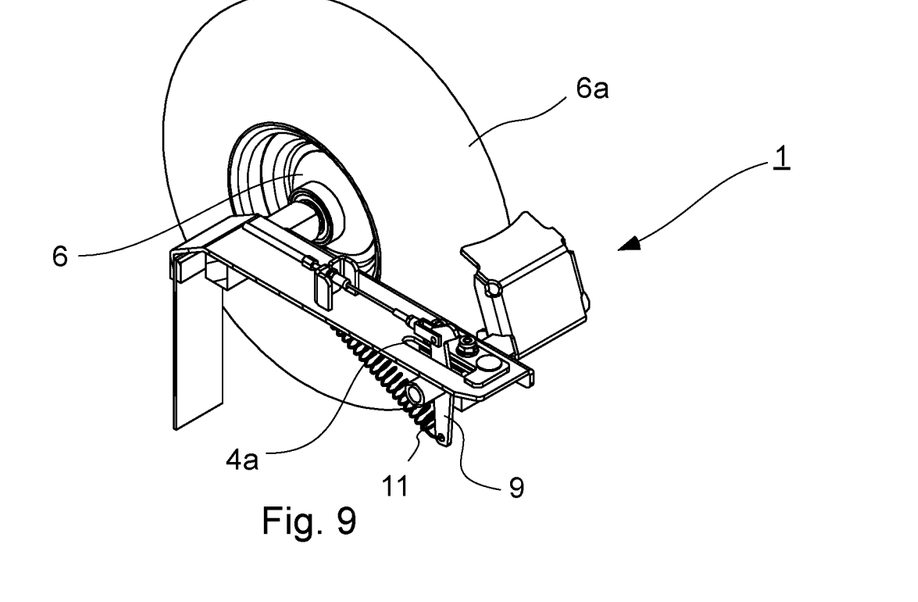
FIG. 9 shows a partial view of a right side wheel and a part of a base frame to which a brake and freewheel arrangement is pivotably connected and in a neutral configuration.
Figure 10:
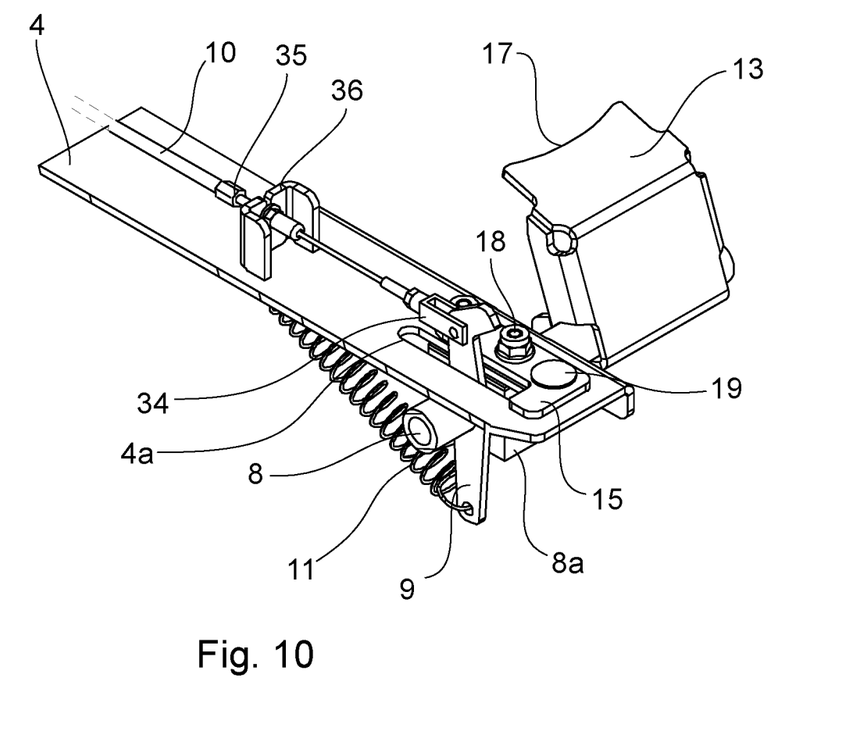
FIG. 10 shows an enlarged view of the brake and freewheel arrangement shown in FIG. 9.
Figure 11:
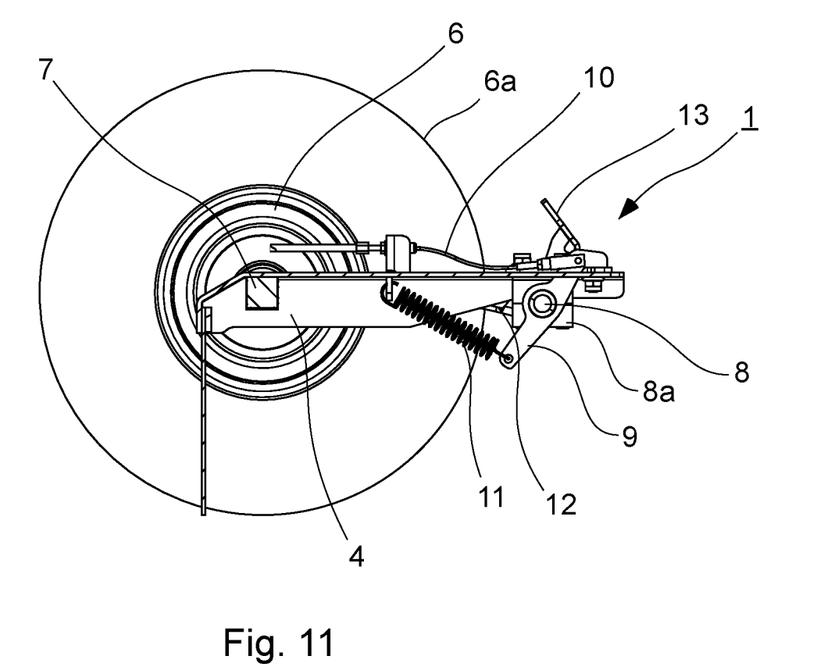
FIG. 11 shows a view similar to FIG. 9, seen from an inner side of the equipment and showing the brake and freewheel arrangement with the wheel blocked in a one-way freewheeling configuration.
Figure 12:
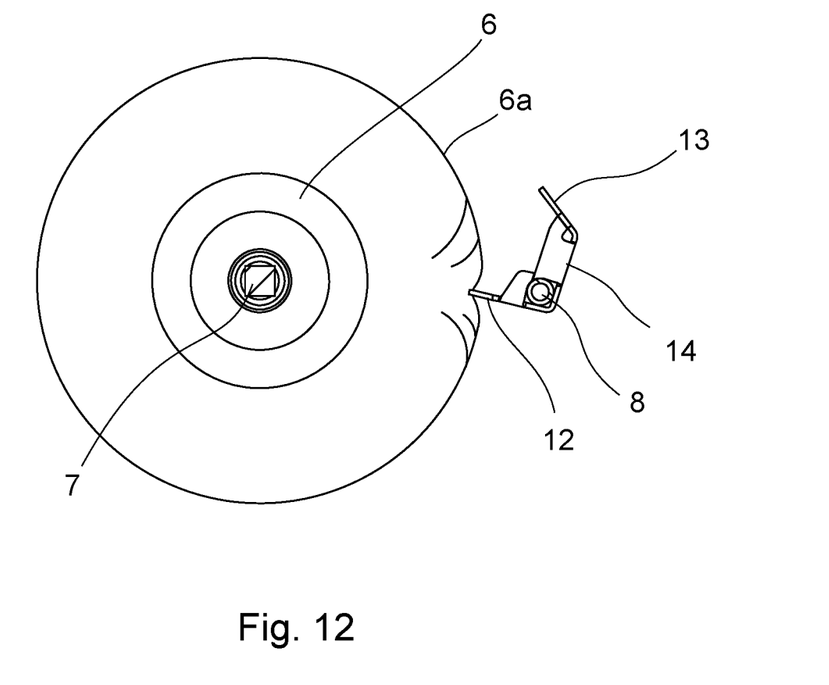
FIG. 12 shows schematically the view of FIG. 11, only showing the wheel and a first and second locking pawl of the brake and freewheel arrangement with the wheel blocked in a one-way freewheeling configuration.
Figure 13:
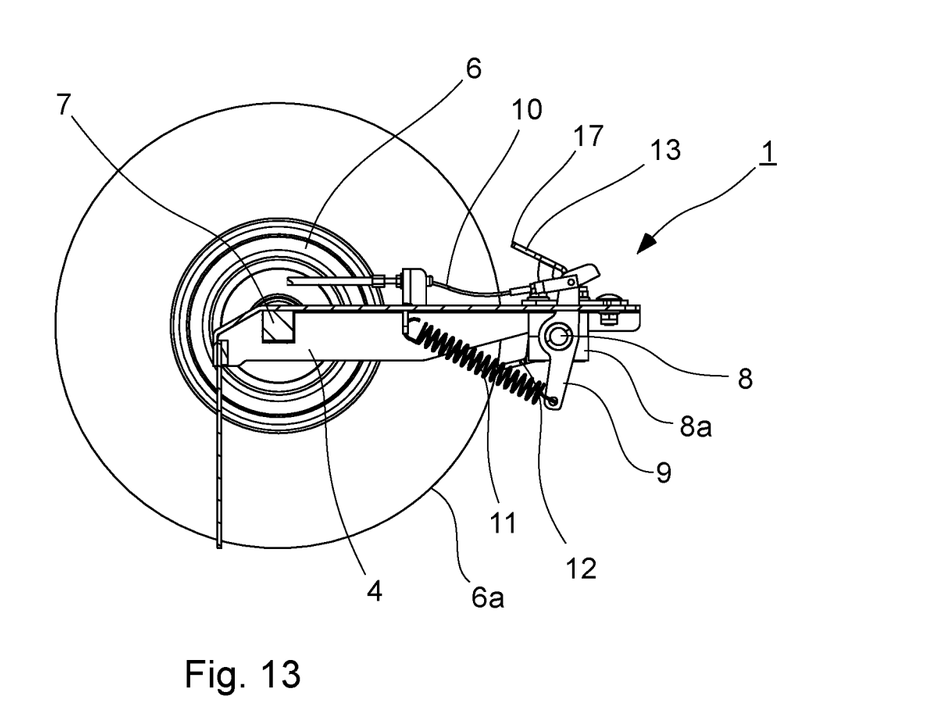
FIG. 13 shows a view similar to FIG. 11, but with the wheel unblocked in a one-way freewheeling configuration.

FIGS. 7 and 8 shows the control levers 21, 22, 23 placed in a neutral position where the cable 10 are tensioned just enough to move the engagement edge 16 of the first locking pawl 12 away from the circumferential surface 6a of the wheel 6 and at the same time the engagement edge 17 of the second locking pawl 12 is also clear from the circumferential surface 6a of the wheel 6 and thereby the brakes or the freewheeling function is not applied to the wheels 6.

The neutral position can be achieved by pulling the freewheeling control lever 23 backwards until the stop bar 33 is reached, whereby the stop pin 26 is pressed against the brake control levers 21, 22 and the stop pin 26 engages with the stop pin notch 26a holding the brake control levers 21, 22 in neutral position.

The freewheeling control lever is held in its outer positions by means of a resilient element such as a spring 27 cooperating with a freewheel lever arm 32.

The freewheel lever arm 32 is shaped similar to the brake connection arm 31, but turned upside down.

The wire or cable 10 comprises an inner cable and an outer sleeve in which the inner cable can move and is in a preferred aspect a Bowden cable.

The brake control levers 21, 22 and the freewheeling control lever 23 can in an aspect be mounted on one and the same axle 24.

The control lever assembly 20 comprising at least one brake control lever 21, 22 and the freewheeling control lever 23 for controlling the brake and freewheeling arrangement 1 is in an aspect mounted on the maneuvering handle assembly 3.

The person skilled in the art realizes that the present disclosure is not limited to the preferred aspects described above. The person skilled in the art further realizes that modifications and variations are possible. For example, other types of cables or rods can be used as long as they provide a flexible but exact or precise connection between control levers and the items to be controlled, such as the brake and freewheeling arrangement. Additionally, variations to the disclosed aspects can be understood and effected by the skilled person in practicing the claimed disclosure, from a study of the drawings, and the disclosure.

The invention claimed is:

1. A brake and freewheel arrangement for a manually maneuverable park and garden equipment, comprising a maneuvering handle assembly, a base frame, and a pair of wheels, each of the pair of wheels mounted to an axle, where the brake and freewheel arrangement comprises:
   a brake pivot axle arranged pivotable in one or more housings, releasably fastened to the base frame;
   a lever, wherein one end of the lever is connected to a maneuvering cable, and an opposite end of the lever is connected to a spring element; and
   a first locking pawl and a second locking pawl, the first locking pawl and the second locking pawl being connected to the brake pivot axle as a unit.

2. The brake and freewheel arrangement according to claim 1, wherein the first locking pawl and the second locking pawl are is connected by a spacer, wherein the spacer is connected to the brake pivot axle.

3. The brake and freewheel arrangement according to claim 1, wherein the one or more housings with the brake pivot axle is/are arranged slidably and lockably relative to the base frame in such a way that a distance between a center of the brake pivot axle and a circumferential surface of one of the pair of wheels is adjustable.

4. The brake and freewheel arrangement according to claim 1, wherein a distance between a center of the brake pivot axle to a first engagement edge of the first locking pawl is less than a distance between the center of the brake pivot axle to a second engagement edge of the second locking pawl.

5. The brake and freewheel arrangement according to claim 4, wherein the first engagement edge of the first locking pawl and/or the second engagement edge of the second locking pawl is curved.

6. The brake and freewheel arrangement according to claim 5, wherein the curve of the first engagement edges is concave and the curve of the second engagement edge is concave.

7. The brake and freewheel arrangement according to claim 1, wherein a stop is provided determining a limit of rotation of the lever in relation to the brake pivot axle.

8. The brake and freewheel arrangement according to claim 7, wherein the stop is adjustable in a direction perpendicular to a circumferential surface of one of the pair of wheels.

9. The brake and freewheel arrangement according to claim 7, wherein the stop is provided by a substantially L-shaped plate, securable by a screw and/or a bolt to the base frame.

10. The brake and freewheel arrangement according to claim 1, wherein a control lever assembly is mounted to the maneuvering handle assembly, wherein the control lever assembly comprises least one brake control lever and a freewheeling control lever for controlling the brake and freewheel arrangement.

\* \* \* \* \*